US006878186B2

(12) United States Patent
Neary

(10) Patent No.: US 6,878,186 B2
(45) Date of Patent: Apr. 12, 2005

(54) PURE VACUUM SWING ADSORPTION SYSTEM AND APPARATUS

(76) Inventor: David Lloyd Neary, 711 Manchester Trail Dr., Spring, TX (US) 77373

( * ) Notice: Subject to any disclaimer, the term of this patent is extended or adjusted under 35 U.S.C. 154(b) by 0 days.

(21) Appl. No.: 10/658,157

(22) Filed: Sep. 9, 2003

(65) Prior Publication Data

US 2005/0051029 A1 Mar. 10, 2005

(51) Int. Cl.[7] .......................................... B01D 53/047
(52) U.S. Cl. .............................. 95/101; 95/41; 95/102; 95/130; 96/115; 96/128; 96/130; 96/144
(58) Field of Search ......................... 95/101, 102, 130, 95/41, 103; 96/108–116, 126–128, 130, 143, 144, 151, 153, 154

(56) References Cited

U.S. PATENT DOCUMENTS

| | | | | |
|---|---|---|---|---|
| 2,626,675 A | * | 1/1953 | Maher ........................... | 96/144 |
| 4,541,851 A | * | 9/1985 | Bosquain et al. .............. | 96/126 |
| 4,892,565 A | * | 1/1990 | Schmidt et al. ............... | 95/101 |
| 5,114,440 A | | 5/1992 | Reis | |
| 5,176,721 A | * | 1/1993 | Hay et al. ...................... | 95/96 |
| 5,370,728 A | * | 12/1994 | LaSala et al. .................. | 95/101 |
| 5,441,559 A | * | 8/1995 | Petit et al. ..................... | 96/125 |
| 5,538,544 A | | 7/1996 | Nowobilski et al. | |
| 5,632,802 A | * | 5/1997 | Grgich et al. .................. | 95/10 |
| 5,656,067 A | * | 8/1997 | Watson et al. ................. | 95/101 |
| 5,656,068 A | | 8/1997 | Smolarek et al. | |
| 5,658,371 A | | 8/1997 | Smolarek et al. | |
| 5,672,196 A | * | 9/1997 | Acharya et al. ............... | 95/97 |
| 5,674,311 A | | 10/1997 | Notaro et al. | |
| 5,759,242 A | | 6/1998 | Smolarek et al. | |
| 5,928,407 A | * | 7/1999 | Amlinger ....................... | 95/21 |
| 5,964,259 A | | 10/1999 | Ackley et al. | |
| 5,997,612 A | * | 12/1999 | Doong .......................... | 95/101 |
| 6,099,618 A | * | 8/2000 | Monereau ..................... | 95/101 |
| 6,183,538 B1 | * | 2/2001 | Naheiri ......................... | 95/98 |
| 6,334,889 B1 | | 1/2002 | Smolarek et al. | |
| 2003/0131732 A1 | * | 7/2003 | Kim .............................. | 96/111 |

FOREIGN PATENT DOCUMENTS

GB          2082082 A     *     3/1982

* cited by examiner

Primary Examiner—Robert H. Spitzer
(74) Attorney, Agent, or Firm—Cash Klemchuk Powers Talyor LLP; Darin M. Klemchuk

(57) ABSTRACT

A pure vacuum swing adsorption/desorption system and method, wherein supplied air feedstock gas is consistently separated to obtain a high-purity oxygen end-product gas mixture, is described. The system and method separate high-purity oxygen product from air by sequenced adsorption and desorption operations occurring exclusively under vacuum pressure conditions. This allows for greatly reduced kilowatt-hours of electric-oxygen power consumption per oxygen ton produced.

20 Claims, 3 Drawing Sheets

PURE VACUUM SWING ADSORPTION SYSTEM AND APPARATUS

BACKGROUND OF THE INVENTION

Within the process gas industry, and in particular within the air separation market, the continuing increasing costs of electric power makes the energy efficiency of gas separation systems of ever increasing importance. The ability of a gas separation system, and an air separation system in particular, to deliver a consistent and uninterruptible high purity oxygen product at all times and under all annual site ambient temperature operating conditions can be of equal importance.

Gas separation feedstock gases can comprise low positive pressure 'vapor recovery' gases developed within facility process operations, or in particular feedstock conditioned atmospheric air at slight sub-atmospheric pressure to produce a predominant rich oxygen product gas. In the case of some production process vapor recovery gases, the desired product gas can be the major molecular gas component within the feedstock gaseous mixture, and this major molecular component can be the gas that is adsorbed within a selected molecular sieve material of correct pore size. In this process gas application case, the desired product gas would be vacuum extracted and delivered during the 'desorption operation' sequence and the waste gas would be extracted from the 'adsorption operation' sequence.

In the case with large commercial, industrial, manufacturing, or power generation facilities wherein a predominant rich oxygen mixture is required for oxy-fuel combustion systems that employ best available technology (BAT) to greatly reduce fugitive combustion exhaust emissions and to greatly increase operating fuel combustion systems' thermal efficiencies, it is important that an air separation system be market available that economically encourages and supports the employment of the BAT Oxy-fuel combustion technology with very low air separation system power consumptions. The air separation system should preferably incorporate all of the following: (a) a commercially available molecular sieve adsorbent material having acceptable nitrogen absorbency characteristics (b) greatly reduced kWh electric power consumptions per ton of oxygen product as compared to currently available art systems, (c) a preferred reduction in system installed capital costs per TPD oxygen rating, and (d) ability to deliver to a facility the required 93% to 94+% oxygen purity and full rated TPD oxygen capacity continuously during all typically site experienced climatic operating temperatures.

The common methods of separating nitrogen from air to provide a highly predominant oxygen gaseous product stream includes the utilization of (a) multi-stage membrane separation units; (b) pressure swing adsorption (PSA) units for producing moderate pressure supplies of predominant oxygen gas; (c) vacuum pressure swing adsorption (VPSA) units, or also interchangeably referred to as vacuum swing adsorption swing units (VSA) units. VPSA or VSA units produce a low positive pressure delivery of predominant oxygen product, and employ air blower/compressors to both produce a positive pressure supply of air to the system adsorber vessels and to induce a vacuum extraction of nitrogen waste gases from the adsorber vessels; (d) Cryogenic-type air separation plants for 99.999% oxygen purity delivery requirements and/or where larger oxygen TPD production rates, production online reliabilities, operating power costs, installed costs, or other factors combine to make current art VPSA or VSA systems a second choice.

However, for facilities with low pressure delivery of 90 to 92% oxygen purity gas and less than 350 TPD oxygen requirements, it is reported that single or multiple parallel-connected current art VSA systems are considered to be the most economic cost choice available for most applications.

Currently employed VSA air separation system processes for producing 85% to 92% low pressure oxygen gas mixtures of high-range double-digit to low range triple-digit TPD oxygen rates are typically designed with two parallel 50% air separation trains, each train comprising one vertical adsorber vessel, and one or two rotary-lobe type air blower/compressors providing combined sequential air pressurization-adsorption operation and vacuum desorption operation. The two trains typically share one common low-pressure oxygen product surge tank. As a required system rated TPD capacity increases, added parallel identical trains of VSA units are provided. For continuously operating facilities requiring greater than 350 TPD oxygen production ratings, the conventional VSA system employment of multiple parallel trains vertical adsorber vessels and rotary-lobe type blowers or compressors become marginally acceptable for several operating reasons. A sample review of U.S. Patents having variations of typical current art conventional VSA systems comprises:

(a) U.S. Pat. No. 5,658,371 describes a slightly modified conventional VSA air separation system of typical operating pressures, whereas U.S. Pat. No. 5,702,504 describes a complex variation of a conventional VSA air separation system process with overlapping operational steps of pressurization/adsorption/desorption/purging/pressure equalization. Such modifications or variations are typically directed to increase the productivity of the employed adsorbent and/or to decrease air separation power requirements.

(b) U.S. Pat. No. 5,114,440 describes a VSA process for the 'enrichment of air' with claims specifically addressed only to the employment of multiple layers of Ca Zeolite A within the three small parallel-connected conventional VSA vertical adsorber vessels, wherein each layer of Ca Zeolite A has different adsorption characteristics. Atmospheric air is drawn into a fan that then distributes a flow of slightly pressurized air into a manifold that connects to the bottom of each adsorber vertical vessel. For each adsorber vessel's adsorption step, air is emitted into each cylinder therein having an internal pressure of 1 bar or slightly less pressure that has been established from its equalization in pressure with the product gas manifold connected to all three adsorber vessels. Following the air's admittance into a given adsorber vessel and its subsequent 93% oxygen rich product flow out of the top of the vessel into the product gas manifold of 1 bar or less pressure, the product gas flows to another fan inlet that induces and propels a flow portion of the manifold's product gas at atmospheric pressure to an unspecified destination for its therein "oxygen-enrichment of air". Without accounting for the fans energy, the vacuum pump 0.544 kWh/cubic meter oxygen production rate is equivalent to an exceptional high 364.8 kWh/ton production rate.

(c) U.S. Pat. No. 5,656,068 describes an improved vacuum pressure swing adsorption process and system having the objectives of higher efficiency and subsequent yielded reduced power costs (inventor contemplated to be about 20%) from those power costs of conventional current art VSA systems having ratings of up to 400 TPD. The VSA system employs two parallel adsorber trains, each train having two vertical adsorber vessels of inventors' stated preferred radial-flow design of vertical adsorber.

(e) U.S. Pat. No. 5,759,242 discloses the design of a vertical adsorber vessel having therein the internal means to direct gas flows radially through the molecular sieve adsorbent material contained within the vertical adsorber vessel. The 'Background of the Art' within U.S. Pat. No. 5,759,242, extensively describes the numerous operating shortcomings of conventional VSA vertical adsorber vessels having axial gas flows through the vertical beds of molecular sieve adsorbents. Listed earlier U.S. Patent art forms of vertical adsorber vessels having radial-flow adsorbent beds are therein disclosed and described, and the uniqueness of U.S. Pat. No. 5,759,242 features therein documented.

(f) U.S. Pat. No. 5,964,259 discloses the apparatus design and method of loading multiple molecular sieve adsorbents into the interior of the welded-closed vertical adsorber vessel therein designed to contain vertical radial-flow adsorbent beds as described in U.S. Pat. No. 5,759,242.

(g) U.S. Pat. Nos. 5,674,311, 5,538,544, and 6,334,889 respectively describe methods by which the conventional art VSA systems' (comprising vertical adsorbers and deep adsorbent beds) inherit problems of adsorbent bed temperature gradients, uneven gas flow distribution, and adsorbent bed fluidization can be reduced to improve adsorbent bed efficiencies.

In summary, conventional VSA systems are marketed with required adsorber vessel forced-air supply pressures ranging from a low of 8 psig to a high of 12 psig (with 10 psig usually being the predominant average supply pressure at the air blower discharge connection) and with the predominant oxygen produced streams supplied to consumer facilities at 1.5 psig to 2.5 psig pressure.

Those skilled in the art will appreciate that the various approaches to VSA separation of gases, contained within the above example patents and other existing published art, predominantly share many common limitations that negatively impacts on their VSA system art's overall consistent gas product purity and economical power consumption. To overcome these common limitations and to satisfy the combined current operational requirements for large commercial, industrial, manufacturing, or power generation facilities (particularly those desiring to employ high-purity/high TPD oxygen capacity for pressurized oxy-fuel B.A.T. combustion systems) has led to the development of the herein described unique pure VSA separation system and apparatus invention having the following objectives:

1. It is a first objective to significantly reduce the electric power consumption required to produce a given desired gas product ton per day (TPD) production rate.
2. It is a second objective to provide an adsorption-desorption assembly that greatly reduces the molecular sieve adsorption bed depths associated with conventional VSA vertical adsorber vessels, thereby achieving reduced differential pressures across the molecular sieve bed and improved even distribution of gas flows throughout the molecular sieve bed.
3. It is a third objective to provide an adsorption-desorption assembly that greatly reduces the molecular sieve bed gas velocities as are employed within conventional VSA vertical vessel systems, thereby achieving significantly increased feedstock gases 'residence time' for gases to permeate into the porous structure of the molecular sieve adsorbent material.
4. It is a fourth objective to provide the means of eliminating conventional VSA deep molecular sieve adsorbent beds' operational temperature variance characteristics that negatively affect the beds' gas separation efficiencies.
5. It is a fifth objective to provide the available alternate apparatus and system means for air separation applications wherein the system has the ability to consistently maintain the rated oxygen purity and oxygen TPD rated production throughout all operating site annual ambient temperature conditions.
6. It is a sixth objective of the present pure VSA gas separation system and apparatus described herein that it can be adaptable to a manufacturer's or system fabricator's chosen selection of adsorbent molecular sieve materials, desired product gas production rate and purity, length and diameter dimensional configurations of adsorption-desorption assemblies, and the employment of the invention alternative features.
7. It is a seventh objective of the present pure VSA gas separation system and apparatus described herein (as configured for air separation production of a high-purity low-pressure, or alternate moderately high pressure oxygen product), that it can be capable of economically producing a facility production rating of up to 1500 TPD of high purity oxygen product as generated by a battery of parallel train described adsorption-desorption assemblies and a preferred quantity of two or more high efficiency compressors having low operating power consumptions and of currently available manufactured model configurations.
8. It is an eighth objective that adequate instrumentation and control devices be incorporated within the overall system to enable complete operational safety and product quality monitoring from the control of gas stream flows/temperatures/and pressures within PLC controlled sequenced adsorption and desorption operations.
9. It is a ninth objective of the present invention to provide a pure VSA gas separation system described herein that can be configured for the production of a high-purity low-pressure oxygen product that alternately can economically be increased in pressure by the addition of one or two stages of highly efficient gas pressure boosting compression.
10. It is a tenth objective of the invention that the herein described adsorption-desorption assembly can be fabricated and conventionally filled with the selected molecular sieve adsorbent at the time of manufacture, or the adsorption-desorption assembly be preferably configured at the time of manufacture to accept varied designs of inserted and removable molecular sieve adsorbent 'cartridge-type' sub-assemblies.
11. It is an eleventh objective of the present pure VSA gas separation system and apparatus described herein, when configured for air separation, that the system's predominant high purity oxygen product can be thereby acceptably employed for oxy-fuel combustion processes employing current best available technology (B.A.T.).
12. It is a twelfth objective that the pure VSA system can employ alternative or unconventional selections of gas compressors, vacuum pumps, adsorption-desorption assembly materials, heat exchange devices, instrumentation and control devices, and other auxiliary system sub-assemblies that utilize existing manufactured equipment components and materials of construction thereof which are not specifically designed for, nor applied to, the manufacture of current art VSA air separation systems.

13. It is a thirteenth objective that the employed adsorption-desorption assembly have the inherit design means that can accommodate the long-term operational employment of both present or later added future molecular sieve material adsorbents whose fragile structures can be incompatible with the cyclic pressure swings and weight bearing loads imposed by conventional vertical adsorber vessels having deep molecular sieve beds.

SUMMARY OF THE INVENTION

To achieve greatly reduced electric power consumptions associated with separation of gases supplied in low pressure streams of mixed molecular gas constituents (referred to hereafter as 'feedstock' gases), the herein invention described air separation system produces a continuous controllable supply of desired high-purity oxygen product gas at either low pressure or alternative moderately higher delivery pressures.

To achieve a feedstock gas separation of the first predominant and molecular sieve adsorbent selective gas constituent from the balance of lesser adsorptive gases contained within the supply feedstock gases, it is necessary to be able to achieve an acceptable and consistent purity product of the lesser adsorptive gases as contained within the supply of feedstock admixture gases.

For the sake of differentiating between conventional designated VPSA or VSA systems and the herein presented invention, the present invention's separation system and contained apparatus will be hereafter referred to (for clarity purposes) as being of a "pure vacuum swing gas adsorption" (pure VSA) system design. The unique pure VSA system departures from the conventional VSA molecular sieve containment apparatus means and does not employ a positive pressure compression of the feedstock gases to create a forced-flow of feedstock gases into and through the molecular sieve adsorbent bed during the adsorption operation process. Rather, only compression of the adsorption operation's produced gas product (at a vacuum inlet pressure) is employed to create the differential pressure across the molecular sieve bed that thereby 'induces' the flow of air feedstock gases to flow into and through the molecular sieve bed.

The pure vacuum swing gas adsorption (pure VSA) separation system of the present invention herein jointly combines firstly a non-conventional cylindrical adsorption apparatus assembly therein being capable of meeting the fore-described invention's applicable objectives, and secondly a pure VSA system whose adsorption operation's operating pressures and gas compression duty varies greatly from traditional art vacuum swing adsorption (VSA) systems.

The gas separation system of the present invention herein contains the apparatus and system design means wherein the pure VSA separation system's sequential and functional steps of adsorption and desorption can occur, particularly in the case of air separation, exclusively under vacuum conditions that thereby provides the lowest power consumption per ton of produced product gas of high-purity oxygen mixture.

The large reduction of electric power consumption from the employment of the pure VSA gas separation system and employed apparatus versa a conventional VSA gas separation system (when applied to air separation) is apparent from the pure VSA adsorption operation's compression being performed (with 15 to 20% more efficient compressors and lesser gas compression ratios) on 84.6% to 88.2% less gas flow rates than required within a comparable rated conventional VSA system adsorption operation. The pure VSA gas separation system provided herein, as configured for air separation production of a 93% to 94+% purity oxygen product gas, is later described to have the ability to achieve an approximate 75% or greater reduction in kWh power consumption per ton of produced low pressure oxygen when compared to conventional art VSA air separation systems having lesser rated 90% purity of oxygen product. The following listed embodiments include descriptions of the pure VSA adsorption-desorption assembly during its functional 'adsorption operation' or 'desorption operation'. These descriptions are applicable to either one or alternately two or more parallel-positioned adsorption-desorption assemblies that can be provided within either of the two given separation trains performing the described sequential adsorption and desorption gas separation operations.

The following 17 Embodiments comprise the subject matter of this invention:

First Embodiment

The presented unique pure vacuum swing adsorption (pure VSA) separation system and apparatus of the present invention herein (for maximum air separation efficiency) can exclusively employ system vacuum pressure conditions during the separation of feedstock gases during both adsorption and desorption operations.

In the case of air separation, wherein conventional VSA systems employ air compressors to develop a 'forced-feed' supply of 10 to 12 psig pressurized air into the VSA system's 'adsorption' operation, the pure VSA system employs a down-stream compressor that creates the vacuum means of 'inducing' a flow of conditioned air (at slight negative gage pressure) into the pure VSA system's 'adsorption operation' sequence. The present invention as shown in FIG. 1 and FIG. 2 therein employs preferred separate dedicated adsorption and desorption compressors to achieve all of the invention's objectives as fore-described herein.

As shown in Table 1, a presented example 90 TPD rated preferred alternative pure VSA air separation system (having a 13.5 psia conditioned air supply and a 17.2 psia (2.5 psig) oxygen product gas delivery pressure) provides a greatly reduced kWh/Ton hourly power consumption versa a conventional VSA unit's kWh/Ton hourly power consumption.

TABLE 1

90 TPD Pure VSA versa Conventional VSA Power Consumptions (kWh/Ton-Hr Oxygen)

| Pure VSA Separation Compressor Efficiency Ranges | 80% | 75% |
| --- | --- | --- |
| Desorption compressor hourly power rate (kWh): | 151.2 | 163.2 |
| Adsorption pre-cooled compressor hourly power rate (kWh): | 40.96 | 43.92 |
| Air-cooled chiller unit power input energy (kWh): | 8.60 | 8.60 |
| Total system hourly power consumption (kWh): | 200.76 | 215.72 |
| Total system hourly rate of product pure oxygen content (Ton/Hr): | 3.75 | |
| Total system kWh/hourly oxygen rate (kWh/Ton-Hr oxygen): | 53.54 | 57.52 |
| Total conventional VSA system (kWh/Ton hourly oxygen): | (218 to 258)* | |

Note
*kWh values reported by a major international supplier of VSA systems, incorporating conventional rotary lobe-type compressors having approximate 60% compression efficiency and the air compressor air-cooler kWh load.

Second Embodiment

The pure vacuum swing adsorption (pure VSA) separation system and apparatus of the present invention herein includes adsorption-desorption assemblies of unique radial-flow design (as shown on FIG. 3 and FIG. 4) that greatly reduces the dimensional depth of the molecular sieve material bed through which feedstock component gases must flow through.

Third Embodiment

From the Second Embodiment's described adsorption-desorption assemblies of unique design, among many operational benefits achieved from a greatly reduced adsorbent bed depth, is the elimination of efficiency robbing temperature gradients and power adsorbing higher differential pressures that can occur across deeper bed molecular sieve adsorbent materials. In the case of air separation, the employed pure VSA system adsorption-desorption assemblies' molecular sieve material bed depth reductions can be within an approximate bed depth reduction range of 70% to 85% from that of a one or two conventional art VSA system (of comparable TPD rating) adsorber vessels having a vertical deep adsorbent bed.

Fourth Embodiment

From the Second Embodiment's described adsorption-desorption assemblies of unique design, the adsorption-desorption assemblies contain a unique cylindrical apparatus for preferred horizontal installation as shown in FIG. 3 and therein containing chosen molecular sieve materials having radial-inward gas flows during adsorption operations (as shown in FIG. 4) and radial-outward gas flows during desorption operations.

Fifth Embodiment

From the Second Embodiment's described adsorption-desorption assemblies of unique design, the pure VSA invention's adsorption-desorption assembly apparatus design incorporates a horizontal cylindrical pipe outer shell or welded rolled plate material assembly as the adsorption/desorption assembly's outer shell having a length to diameter ratio greater than 2:1.

Sixth Embodiment

From the Second Embodiment's described adsorption-desorption assemblies of unique design and Fifth Embodiment described adsorption-desorption assemblies having a horizontal-positioned cylindrical outer shell, either one or both ends of the cylindrical outer shell's end-closure means can be of removable bolted blind flange-type as shown in FIG. 3 or the end-closure alternately having attached hinged-type assembly means of opening and closing. The cylindrical outer shell and end-closure means provides the adsorption-desorption assembly with the means for easy installation or change-out of molecular sieve adsorption bed materials contained within the adsorption-desorption assembly.

Seventh Embodiment

The pure vacuum swing adsorption (pure VSA) separation system and apparatus of the present invention herein employs two parallel-positioned trains of unique gas adsorption-desorption assemblies, with each said train comprising either one or alternately two or more adsorption-desorption assemblies. While the first train is performing the sequenced adsorption operation of pure VSA gas separation, the second train is performing the sequenced desorption operation of pure VSA gas separation. Upon completion of the adsorption operation by the first train, the first train commences to perform it's desorption operation while the second train commences to perform its adsorption operation. Both the adsorption operation and desorption operations can be accomplished within equal time intervals, these time intervals preferably being of approximately 30 seconds duration or less.

Eighth Embodiment

From the Second, Fourth, Fifth, and Sixth Embodiments' described adsorption-desorption assembly having molecular sieve bed material contained within a horizontal-positioned cylindrical shell with removable shell end-closures, the molecular sieve adsorption bed material can be contained within one or alternately 2 or more molecular sieve 'cartridge-type' sub-assemblies that can be inserted or removed from one or both ends of the adsorption-desorption assembly. A detailed design of such a molecular sieve cartridge sub-assembly is not within the scope of the invention, however, FIG. 4 provides an example cross-sectional view for describing the example functional elements of a molecular sieve 'cartridge-type' sub-assembly that can be integrated into the collective described adsorption-desorption assembly apparatus employed by the pure VSA system to achieve the overall described objectives, design, operational functions and benefits provided by the herein invention.

Ninth Embodiment

From the Second, Fourth, Fifth Embodiments' described adsorption-desorption assembly having a horizontal-positioned cylindrical outer shell with removable or hinged-type shell end-closures, and the Eight Embodiment described molecular sieve adsorption bed material contained alternately within the preferred molecular sieve 'cartridge sub-assemblies, the outside diameter surface area of the molecular sieve material contained with the individual or collectively employed cylindrical molecular sieve 'cartridge-type' sub-assemblies surface areas can be approximately 200% to 700% greater (2:1 to 7:1 surface area ratio) than the lower-most and first adsorbent bed layer contact surface area into which feedstock gas first enters within a conventional VSA system's one or more vertical adsorber vessels of equivalent combined molecular sieve material volume. With a pure VSA system (therein employing one or more adsorption-desorption assemblies in each fore-described train for air separation) a surface area ratio of 4:1 can provide a range of 65% to 80% gas velocity reductions within the outer cylindrical portion of the molecular sieve bed wherein the predominant portion of nitrogen is selectively adsorbed.

Tenth Embodiment

From the Ninth Embodiment' described reduced bed gas velocities within the initial outer surface layer of molecular sieve material contained with the cylindrical molecular sieve cartridge sub-assemblies, the reduced velocities can be maintained with small variances throughout the complete bed depth. As shown in FIG. 4, the molecular sieve adsorbent material is contained within multiple wedge-shape segmental sections that collectively (within a given length of the cylindrical molecular sieve cartridge sub-assembly) make up the total volume of molecular sieve material contained within a molecular sieve cartridge sub-assembly.

In the case of air separation applications, the supplied conditioned air flow of 78% predominant nitrogen is directed radially-inward at greatly reduced flow velocity through the initial outer surface layer of nitrogen-selective molecular sieve material contained with the cylindrical molecular sieve cartridge sub-assembly. As the air feedstock gases incrementally advance into the nitrogen-selective molecular sieve material, nitrogen is adsorbed and the volume of continued radially-inward flow of gases decreases.

This decrease in gas volume coincides with an approximate proportional and progressive decrease in molecular sieve material cross-sectional area contained within the wedge-shape bed through which the reduced volumes of gases flow radially-inward. As a result, there can be only minor variances between the velocities of gases entering the adsorption-desorption assembly's cylindrical molecular sieve cartridge sub-assembly and the predominant oxygen product gas flow velocities exiting from the molecular sieve material contained within the cylindrical molecular sieve 'cartridge-type' sub-assembly.

In the case of air separation, these significant gas velocity reductions satisfies the inventions further objectives of achieving (a) an increased quality of even gas flow distribution across the molecular sieve adsorption bed; (b) increased feedstock air "residence time" within a given mass of molecular adsorption bed material, thereby enhancing the permeation and nitrogen adsorption by the employed nitrogen-selective molecular sieve material; (c) decreased adsorbent bed gas flow pressure losses per linear foot of adsorbent bed depth; and (d) elimination of high gas flow forces that can be imposed on selected molecular sieve material of fragile dimensional structure during rapid cyclic changes in pressures and gas flows, whereby the abrading or powdering degradation of the molecular sieve material granules or pelletized forms occurs from movement of one against the other within the adsorption bed.

Eleventh Embodiment

From the Fourth Embodiments' described adsorption-desorption assemblies containing chosen molecular sieve materials (adsorbents) having radial-inward gas flows during adsorption operations, the described sequential flows of gases are provided in the following Detailed Description of the Preferred Embodiment.

Twelfth Embodiment

From the Third Embodiment's described elimination of efficiency defeating temperature gradients that can occur within deep molecular sieve beds, and as experienced in air separation systems employing Zeolite-based adsorbents, the feedstock conditioned dry air can normally be supplied to the pure VSA system at a regulated temperature that coincides with the optimum nitrogen-adsorption efficiency temperature of the shallow-depth adsorbent material employed within the adsorption-desorption assembly. When required during all site ambient operating conditions, the invention provides alternative means for maintaining an approximate constant conditioned air feedstock gas temperature into example chosen Zeolite-based adsorbent beds during the pure VSA adsorption operation. Maintaining the chosen molecular sieve bed at an example optimum adsorption efficiency temperature of 100° F. to 120° F. thereby can enable the pure VSA system to maintain its rated oxygen TPD production at all site ambient temperature conditions.

When the source of conditioned air cannot be supplied at a sufficiently desired elevated temperature coinciding with the optimum adsorption efficiency temperature of the employed adsorbent material, waste heat from the continuously operating desorption compressor's gas discharge waste gas stream can be transferred to the sub-atmospheric conditioned gas supply stream as shown in FIG. 2 to establish the desired elevated conditioned air stream temperature supplied to the adsorption-desorption assemblies.

Thirteenth Embodiment

From the First Embodiment's described exclusive employment of system vacuum pressure conditions during the separation of feedstock gases during adsorption operations and the following desorption operations, the desorption operation of conventional VSA and pure VSA systems are similar in function wherein both systems employ bottom-end single-digit psia vacuum pressures for induced extraction of residual and waste gases from within their respective 'adsorber vessels' and 'adsorption-adsorber assemblies'. The pure VSA system preferably employs a dedicated centrifugal-type desorption compressor, whereas the conventional VSA system uses a common rotary lobe-type blower compressor for both adsorption and desorption operations. Both the pure VSA system as applied to air separation (and to conventional VSA systems) employ a portion of the oxygen product gas as a purge gas that is recycled back into the respective 'adsorption-adsorber assemblies' and 'adsorber vessels' and to aid in desorbing the molecular sieve adsorbent of nitrogen during the desorption operation.

At the time of terminating the extraction of waste gases from the pure VSA system's adsorption-desorption assembly, the later portion of the overall purge gas volume is employed to rapidly and approximately equalize the internal pressure of the adsorption-desorption assembly to that of the oxygen product gas manifold source that supplies the purge gas.

Pure VSA and conventional VSA systems (having identical oxygen TPD ratings) will vary in their individual desorption operation's energy requirements, due primarily to differences in the variances in their applied compressor's efficiencies and the system's ratio of net delivered oxygen product volume to feedstock air volume.

Fourteenth Embodiment

From the Thirteenth Embodiment described employment of a portion of the pure VSA gas separation systems product gas to serve as a recycled purge gas during the desorption operation, the purge gas flow is re-directed back into the adsorption-desorption assembly to aid in the purging of the adsorption-desorption assembly of residual waste gases prior to the beginning of the following sequenced adsorption operation. In the case of air separation, the majority of employed purge gas is vented to atmosphere along with residual and nitrogen waste gases. Total typical allocated purge gas volumes can be approximately 25% to 40% of the gross oxygen product gas, depending on system efficiencies.

In conventional VSA systems, the air compression power energy employed to generate the typical example 2.5 psig gross oxygen product, is substantially wasted with the 25% to 40% majority portion thereafter vented to atmosphere with other waste gases. In the pure VSA system, no compression work energy has been expended on the example 12 psia gross oxygen product gas at the manifold point wherein purge gas (oxygen product) is withdrawn for recycling back to the adsorption-desorption assembly.

Fifteenth Embodiment

From the Thirteenth Embodiment described employment of a portion of the pure VSA gas separation systems product gas to serve as a recycled purge gas during the desorption operation, in the case of air separation with example Zeolite-type molecular sieve materials, both the conventional VSA and pure VSA systems can have predominant oxygen product gas temperatures in the range 100° F. to 120° F., with said temperature range being approximately that of the adsorption operation temperatures at which many popular Zeolite-based molecular sieve materials perform efficiently in their degree of nitrogen selectivity. Conversely, at lower gas temperatures, these Zeolite-based molecular sieve materials decrease in their ability to selectively adsorb or retain nitrogen within their porous material structure. Consequently, the employed 100° F. to 120° F. temperature purge gas is limited in its ability to efficiently affect a more complete desorbing extraction of nitrogen from the molecular sieve material.

The pure VSA system and apparatus described later and shown in FIG. 2 herein provides the alternate means to produce a supply of chilled temperature purge gas that will increase the desorption operation's efficiency in desorbing nitrogen from within the adsorption-desorption assembly's internal molecular sieve bed sub-assembly. The FIG. 2 shows alternate means of chilling the gross oxygen product gas stream, thereby also providing beneficial gas chilling of the net oxygen product gas stream supplied to the adsorption compressor to achieve reduced power consumptions.

As shown in Table 2 and Table 3, computer process simulation data values show the trend-changes in gas temperatures and power consumptions as employed gas compression efficiencies decline from the present available 80–81% pure VSA preferred compressors to lower efficiency compressors. Table 2 data is for the non-cooled oxygen product adsorption compressor, and Table 3 data is for the alternative pre-cooled oxygen product adsorption compressor. Both Table 2 and 3 values are for an example product stream of 11.7 psia 95% oxygen gas mixture compressed to 17.2 psia (2.5 psig) for a rated 90 TPD oxygen stream content within a 95% oxygen content delivered product.

TABLE 2

Pure VSA Adsorption Compressor Power Requirements - 90 TPD Oxygen

| Non-cooled Compressor Efficiency (%) | 80% | 75% | 70% |
|---|---|---|---|
| Product gas supply temperature (° F.): | 110 | 110 | 110 |
| Discharge gas temperature (° F.): | 193.8 | 199.7 | 206.6 |
| Gas compression horsepower (GHP): | 57.00 | 60.66 | 65.35 |
| HP with 5% mechanical losses (CHP): | 59.85 | 63.69 | 68.62 |
| CHP equivalent electric power (kW): | 44.68 | 47.53 | 51.20 |
| kW Power/95% motor Efficiency (kW): | 47.01 | 50.03 | 53.90 |
| kWh rate from 3.75 Ton/Hr oxygen (kWh/ton): | 12.54 | 13.34 | 14.37 |

TABLE 3

Pure VSA Alternate Pre-cooled Adsorption Compressor Power Requirements 90 TPD Oxygen Production

| Pre-cooled Compressor Efficiency (%) | 80% | 75% | 70% |
|---|---|---|---|
| Product Gas Supply Temperature (° F.): | 40 | 40 | 40 |
| Discharge Gas Temperature (° F.): | 114.2 | 119.5 | 125.5 |
| Gas Compression Power (GHP): | 49.66 | 53.26 | 57.34 |
| HP with 5% mechanical losses (CHP): | 52.14 | 55.92 | 60.21 |
| CHP equivalent electric power (kW): | 38.91 | 41.73 | 44.93 |
| kW Power/95% motor efficiency (kW): | 40.96 | 43.92 | 47.28 |
| kWh rate for 3.75 Ton/Hr oxygen (kWh/ton): | 10.92 | 11.71 | 12.61 |

Tables 2 and 3 show that the described example 40° F. gas chilling accomplishes both a reduction in kWh power for adsorption compressors having a range of 70% to 80% compression efficiencies and a greatly desired reduction in oxygen product gas discharge temperatures as shown to be 114° F. for the inventor's preferred selected 80–81% centrifugal compressor series of standard compressors. For the preferred 80% efficient adsorption compressor, the 40° F. gas pre-chilling provides a 12.87% reduction in adsorption compressor power consumption from that of the non pre-cooled unit.

Sixteenth Embodiment

From the Fifteenth Embodiment described alternative means to produce a supply of chilled temperature purge gas that will increase the desorption operation's efficiency in desorbing nitrogen from the nitrogen-selective molecular sieve adsorbent contained within the adsorption-desorption assembly's internal molecular sieve bed sub-assembly and reduce the adsorption compressor's power consumption and operating temperatures, a conventional standard model of refrigeration chiller (as shown in FIG. 2) can be alternatively employed to circulate a chilled heat transfer fluid (such as a water-ethylene glycol mixture) into and out of a gas heat exchanger that is positioned within the pure VSA system's oxygen product manifold that is end connected to the down-stream inlet of the adsorption compressor. The described gas chilling system can be capable of producing the example 40° F. of oxygen product gas temperatures at the example vacuum pressure conditions, as well as alternately providing the required additional chilling capacity to provide a 40° F. of oxygen product gas temperatures to the inlet of the example FIG. 2 additional two stages of gas booster compression that can be required for higher oxygen product delivery pressures to some oxy-fuel combustion processes. As with the adsorption compressor, the example preferred oxygen product 40° F. gas temperature to each stage of gas boosting compression lowers both gas operating temperatures and reduces power required for gas compression.

Seventeenth Embodiment

From the First Embodiment described unique pure vacuum swing adsorption (pure VSA) separation system and apparatus of the present invention herein, the presented invention can employ unconventional materials and mechanical equipment which are not specifically designed for, nor applied to, the manufacture of current art gas separation systems and apparatus contained therein.

The presented pure VSA invention's unconventional apparatus and materials for commercial and industrial gas separation applications includes preferred centrifugal-type or positive displacement-type compressors having long life-cycles, high gas compression efficiencies, and preferred integrated internal assembly means of controlling gas flow rates. Systems having oxygen production ratings greater than 1000 TPD can alternately employ high efficiency axial-type compressors. The presented invention's unconventional apparatus and materials can include the employment of PE3408 high density polyethylene adsorption-desorption assemblies up to 48 inches in diameter and associated piping systems designed for up to 50 years of operating life for the presented system's application to air separation operating pressures and temperatures.

Overall System and Apparatus

The pure vacuum pressure swing adsorption (pure VSA) system and apparatus of the present invention is applicable to a variety of gas separation applications. In the pure VSA system and apparatus particular described case herein of its application to air separation, the presented invention departs from current art VSA air separation system designs and apparatus component configurations to particularly achieve the following major categories of air separation system operating objectives: (a) Approximate 70% to 75% decreased electric power operating costs per ton of produced oxygen; (b) increased continuous purity of oxygen product gas; (c) economical pure VSA systems having maximum daily oxygen production ratings up to 1500 TPD; (d) a vacuum swing adsorption system with the ability to employ highly efficient molecule sieve adsorbents having fragile characteristics that are incompatible for installation within conventional VSA adsorber bed designs; (e) a suitable system having apparatus means that can accommodate future easy facility on-site change-outs of adsorption-desorption assemblies molecular sieve materials, due to changes in gas separation duties or for the incorporation of future developed new and more highly efficient molecular sieve materials including future semi-conducting porous synthetic molecular sieve materials; (f) ability to sustain 100% TPD rated production rates under all operating site annual ranges of ambient temperatures; (g) a gas separation system's gas compression equipment apparatus having a 40 to 60% system capacity turndown capability while retaining 75–80% compression efficiencies; and (h) suitability for economical 1.1 to 1.45 bar oxygen deliveries and/or alternate 3 to 7 bar pressurized oxygen deliveries to combustion processes employing oxy-fuel combustion techniques that achieve best available technology (B.A.T.) results for ultra-low low exhaust emissions and high process thermal efficiencies.

DETAILED DESCRIPTION OF THE PREFERRED EMBODIMENT

Figure 1:
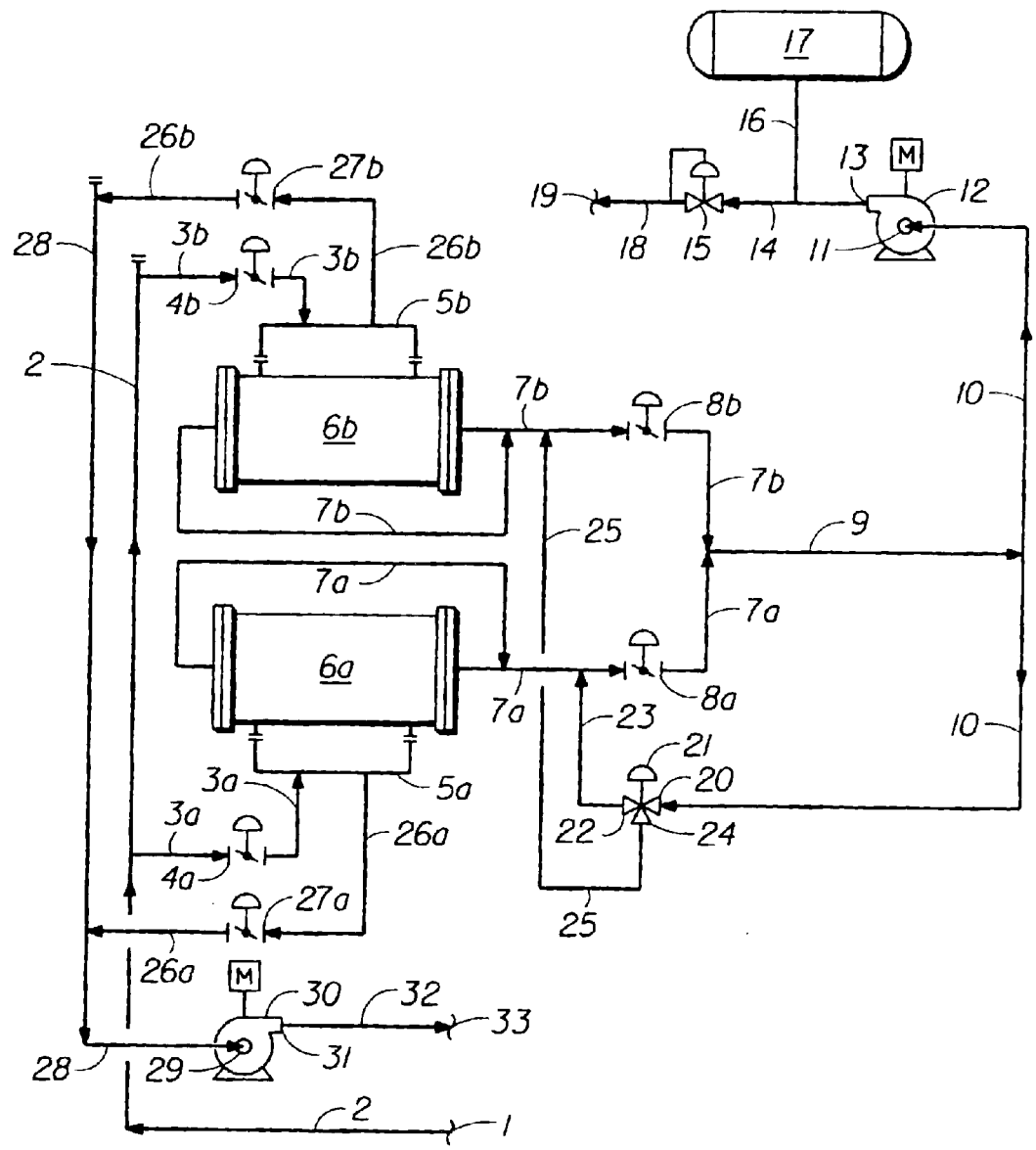
FIG. 1 is a simplified schematic flow diagram of the invention's pure VSA gas separation system with employed apparatus.

Referring now more particularly to FIG. 1, the gas separation system's conditioned feedstock gas is supplied at connection 1 with flow into manifold conduit 2 for gas distribution through two parallel branch conduits 3a and 3b containing supply-isolation control valve 4a and 4b respectively. Branch conduits 3a and 3b are end-connected to adsorption-desorption assembly inlet manifolds 5a and 5b that distributes feedstock gases into the two parallel gas separation trains, each train comprising one example adsorption-desorption assembly 6a and 6b respectively. Each adsorption-desorption assembly outer shell can have one or two or more connections for the flow supply or withdrawal of gases. In the case where each gas separation train contains more than one adsorption-desorption assembly, the number of adsorption-desorption inlet manifolds connecting the adsorber assemblies to the branch conducts 3a and 3b increases accordingly with the number of added connected adsorption-desorption assemblies in each train.

The feed stock gas enters each example parallel train adsorption-desorption assembly 6a and 6b and flows radially-inward through each adsorption-desorption assembly's internal adsorbent bed in a (as further described in FIG. 4) to the adsorption-desorption assembly's central axial-positioned product gas collection volume space. Within this collection volume space, the desired separated product of lesser gaseous component or components of the feedstock gas mixture is flow-collected and withdrawn from the example adsorption-desorption assemblies 6a and 6b through parallel branch conduits 7a and 7b respectively containing product flow-isolation control valves 8a and 8b and with conduit end connections to common conduit 9. The fore-described desired product of lesser Mol % gaseous component or components of the feedstock gas mixture can be extracted from each adsorption-desorption assembly through either one or example shown two central axial-positioned ends of the adsorption-desorption assemblies. In the case of air separation, the desired gas product is a highly predominate oxygen gas mixture.

Each gas separation system adsorption-desorption assembly train can perform a complete cycle of series-sequenced adsorption and desorption operations, with the first adsorption-desorption assembly train performing a pure VSA system adsorption operation while the second adsorption-desorption assembly train performs the pure VSA system desorption operation sequence that incorporates the later described introduction of purge gas into the adsorption-desorption assembly. The first adsorption-desorption assembly train then performs the desorption operation while the second adsorption-desorption assembly train performs the adsorption sequence operation, each described operation essentially having the same time duration.

The desired product of lesser Mol % gaseous component or components of the feedstock gas mixture extracted with induced flow from the example train adsorption-desorption assemblies 6a and 6b are sequentially conveyed through branch conduits 7a and 7b respectively into conduit 9 and thereafter continuing into manifold 10 that is end-connected to the inlet connection 11 of motor-driven adsorption compressor 12 continuously operating at controlled vacuum pressure inlet conditions. Adsorption compressor 12 discharges the desired product of lesser Mol % gaseous component or components of the feedstock gas mixture at a positive pressure through compressor outlet gas connection 13 into conduit 14 that is end-connected to downstream gas pressure regulator 15. Pressure regulator 15 supplies a preset desired pressurized stream of fore-described product gas into supply conduit 18 that is end-connected to gaseous product delivery point 19. If required within a given system design, conduit 14 can contain a side-branch connected conduit 16 that is end-connected to a gas pressure stabilizing surge tank 17. The low pressure pure VSA low pressure air separation system's predominant oxygen gas product delivery point 19 pressure is 2.5 psig. For the pure VSA gas separation desorption sequence, the adsorption-desorption assembly 6a and 6b is isolated from the feedstock gas supply and extraction product gas conduits by the closure of supply-isolation control valves 4a and 4b, and product flow-isolation control valves 8a and 8b respectively. Within each train of example parallel adsorption-desorption assemblies 6a and 6b, the desorption operation is initiated following the closed-positioning of valves 4a and 8a, or 4b and 8b respectively, positioning of valve 21 described later, and the open-positioning of valves 27a or 27b respectively. During a given train's desorption operation, a mixture of residual feedstock gases, molecular sieve desorbed gas, and purge gases (hereafter all collectively referred to as "waste gases")

within adsorption-desorption assembly 6a or 6b are vacuum induced to flow radially-outward within adsorption-desorption assemblies 6a or 6b into manifolds 5a or 5b respectively. From manifolds 5a or 5b, the waste gases continue with induced flows into conduit 26a or 26b respectively which therein contains open-positioned control desorption flow-isolation control valves 27a or 27b respectively. Conduits 26a or 26b are end-connected to a common manifold 28 that is downstream end-connected to the inlet connection 29 of motor-driven desorption compressor 30 that can operate continuously at varying vacuum pressure and constant ACFM inlet conditions. Desorption compressor 30 discharges the adsorption-desorption assemblies sequential flows of extracted waste gases at an increased and positive pressure through compressor outlet gas connection 31 into conduit 32 that is downstream end-connected to delivery point 33. In the case of air separation, the slight positive pressure flow of waste gas (predominantly comprising nitrogen gas) flowing through conduit 32 is typically vented to atmosphere at delivery point 33.

Figure 2:
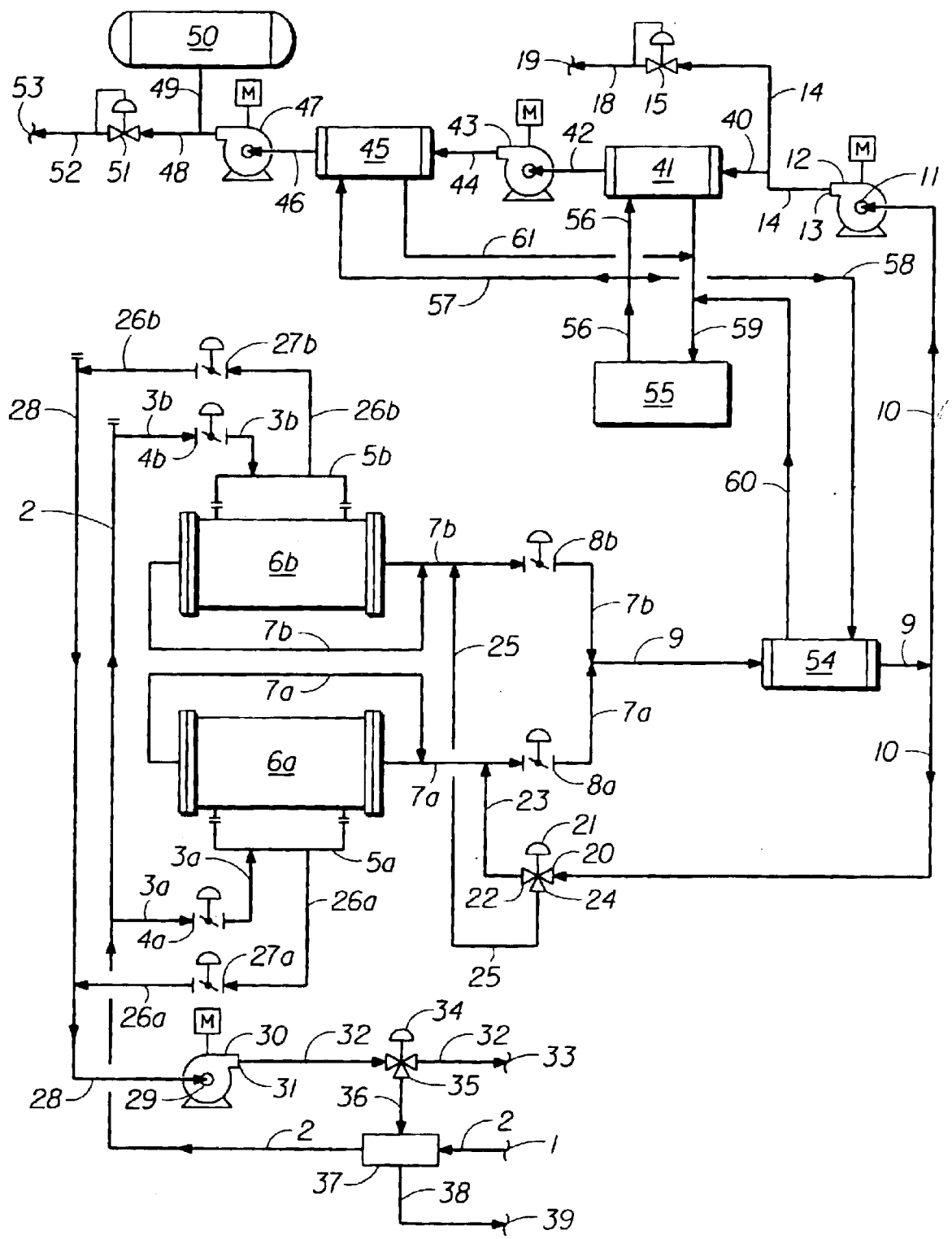
FIG. 2 is a schematic flow diagram describing the invention's alternate pure VSA system configuration and apparatus for yielding maximum operating benefits.

During the example of air separation, the vacuum induced desorption operation within each adsorption-desorption assembly lowers the initial internal pressure from an example 11 to 12.5 psia pressure to an example low-end 4 to 6 psia pressure level. As the internal adsorption-desorption assembly pressure is being reduced to this approximate example low-end vacuum pressure range level, a limited controlled flow of separated product gas (acting as a purge or reflux gas of the molecular sieve bed and void spaces within the adsorption-desorption assembly) is permitted to flow from manifold 10 source (at an example 12 psia pressure) back into either adsorption-desorption assembly 6a or 6b that is operating in its desorption operation. Manifold 10 supplies product gas to the inlet port 20 of valve 21 that control-directs the flow of purge gas flow from outlet port 22 into conduit 23 connected to downstream conduit 7a, or from outlet port 24 into conduit 25 connected to downstream conduit 7b, for continuing conduit reverse-flow induced passage of purge gas at reduced psia pressure into the respective 6a or 6b adsorption-desorption assembly's central axial-positioned product gas volume space as described later for FIG. 4. From this central axial-positioned space, the purge gas flows radially-outward through the molecular sieve bed in a counter-current flow induced by desorption compressor 30 extracting waste gases from the adsorption-desorption assembly 6a or 6b undergoing a sequenced desorption operation. Referring now more particularly to FIG. 2, FIG. 2 provides added alternative apparatus and system means to the invention's FIG. 1 apparatus and system design. The FIG. 2 added alternatives can contribute to maintaining a higher desired product purity and lowest power consumption over a wide range of operating conditions that includes required increased gas product delivery pressures. In particular, FIG. 2 shows the alternate added apparatus and system design features to optimize the invention's application to air separation at all ambient air conditions and sustain production of high purity oxygen from chosen common commercially available adsorbent materials, all with greatly reduced electric power consumptions (kWh) per ton rate of produced oxygen. Within FIG. 2, a chilled gas heat exchanger 54 can alternately be incorporated into conduit 9, thereby reducing the product gas temperature that enters manifold 10. Particularly in air separation, many commonly employed Zeolite type adsorbent materials are more efficient in their adsorption of nitrogen at adsorbent bed operating temperatures that can range between 100° F. to 130° F. and progressively less capable of holding nitrogen at lesser molecular sieve bed operating temperatures. Decreasing the product gas temperature in manifold 10 provides a source of chilled purge gas whose low temperature enhances the effectiveness of the adsorption-desorption operation in desorbing nitrogen from the chosen molecular sieve bed material. Decreasing the product gas temperature in manifold 10 further provides the means for a decreased adsorption compressor 12 inlet and outlet gas temperature, as well as the means for reducing kWh power consumption to compress a given mass flow of oxygen product gas to a given required positive gage pressure.

Particularly in air separation wherein commonly employed Zeolite type adsorbent bed materials are more efficient in their adsorption of nitrogen at operating temperatures that can be in the range of 100° F. to 130° F., the invention can alternately employ a heat exchanger 37 positioned within conduit 2 that supplies feedstock gas (conditioned air in the case of air separation) to adsorption-desorption assemblies 6a and 6b. When the feedstock gas is delivered to supply connection 1 at a temperature that is less than the chosen molecular sieve bed temperature for the bed's desired retention of the selected predominant waste gas component (nitrogen in the case of air separation), heat exchanger 37 can transfer the required amount of heat into the feedstock gas from the diverted high temperature waste gas discharged from desorption compressor 30. Valve 34 can be positioned within conduit 32 to divert a portion of high temperature waste gas into conduit 36 that is end-connected to heat exchanger 37, with subsequent reduced temperature waste gas flow exiting from exchanger 37 into conduit 38 for gas flow to delivery point 39. Portions of waste gas flow contained within conduit 32 that are not diverted to heat exchanger 37 are conveyed to conduit end delivery point 33. In the case of VSA air separation, the predominant nitrogen content waste gas can be vented to atmosphere at points 33 and 39.

Within FIG. 2, the alternate added apparatus and system means are shown by which the invention's FIG. 1 apparatus and system design can be provided with alternative energy efficient means for providing both low and higher psig pressure streams of pure VSA separated product gas to satisfy a facility's operating processes requirements. In the case of pure VSA air separation wherein the product gas is high purity oxygen, the alternate added apparatus and system means are shown by which elevated oxygen temperatures can be minimized to achieve increased operating safety conservatism and low life cycle operating costs.

In the case of pure VSA air separation, alternately requiring a higher than conventional supply of 1.5 to 2.5 psig oxygen product, the invention example conduit 10 supply of oxygen product gas can enter inlet connection 11 on adsorption compressor 12 at approximately 11 to 12 psia and be discharged from compressor connection 13 at approximately 3 to 6 psig into conduit 14. Conduit 14 is end-connected to downstream-positioned pressure regulating valve 15 that controls the conduit 18 delivery pressure of low pressure oxygen product gas to point 19. Conduit 14 contains a side-stream connected conduit 40 that supplies approximately 3 to 6 psig oxygen product gas into chilled gas exchanger section 41 wherein the oxygen product gas can be lowered in temperature to an example exit gas temperature range of 30 to 40° F. into conduit 42 that is end-connected to stage 1 gas booster compressor 43. Compressor 43 discharges the oxygen product gas at increased pressure into conduit 44 that is end-connected to chilled gas exchanger section 45 wherein the oxygen product gas can be lowered in temperature to an example exit gas temperature range of 30° F. to 40° F. into conduit 46 that is end-connected to stage 2 gas booster compressor 47. Compressor 47 discharges the oxygen product gas at increased pressure into conduit 48 that is end-connected to pressure regulating valve 51 that maintains a regulated output supply of oxygen product gas within conduit 52 that is end-connected to oxygen product delivery point 53. When required by a particular system design to meet pressure and oxygen product flow delivery specifications, a pressurized surge vessel 50 can be connected through conduit 49 to conduit 48.

In the alternative application of chilled gas exchangers, a standard modular packaged refrigeration chiller unit 55 can supply a circulated chilled liquid heat adsorption fluid through a common supply manifold 56 and return common manifold 59 that are directly end-connected to gas chiller 41. Manifolds 56 and 59 are indirectly connected to gas chiller exchanger 54 through side-branch conduits 58 and 60 respectively. Side branch conduits 57 and 61 connect gas chiller exchanger 45 respectively to manifolds 56 and 59. The standard modular packaged chiller unit may be of the air-cooled type or water cooled type, with the water-cooled type providing the lowest power consumption and lowest life-cycle operating expense with accompanying greater first cost.

Figure 3:
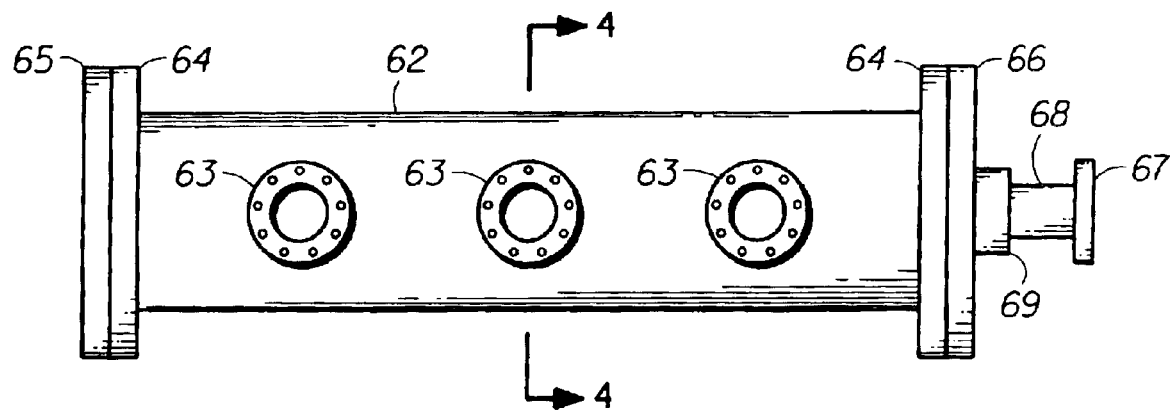
FIG. 3 is a side view of the invention's employed gas adsorption-desorption assembly apparatus.

Referring now more particularly to FIG. 3, the invention's adsorption-desorption assembly 62 is shown in a typical preferred horizontal side-view position. The adsorption-desorption assembly's cylindrical body shell material can be either of a typical example carbon steel alloy pipe or of rolled and welded steel plate, or alternately high density polyethylene (HDPE) grade 3408 extruded pipe of appropriate SDR number. The diameter and length of the adsorption-desorption assembly 62 will primarily vary with the economical accommodation of desired rated gas separation capacity for each adsorption-desorption assembly and the chosen molecular sieve material. Adsorption-desorption assembly shell flanged inlet gas connections 63 are shown as being of quantity three in number but can be one in number for adsorber assemblies of less than 6 feet in shell length. Gas connections 63 serve as both supply gas connection means for the flow of feedstock gases into the assembly during the adsorber assembly's adsorption sequence operation as well as the exhaust flow connection means for waste gases flow extraction from within the adsorption-desorption assembly during its desorption sequence operation.

As shown in FIG. 3, flanged connections 64 can be welded to both ends of the example adsorption-desorption assembly shell. A gasketed blind flange 65 can provide the closure means for one end of the example adsorption-desorption assembly. Alternately on one end of a steel shell 62, 64 and 65 may be replaced by one ASME pipe or vessel weld cap. Although a detailed design of the adsorption-desorption assembly is not within the scope of the invention, one or both ends of the adsorption-desorption assembly can be provided with a subassembly closure means which can comprise the comparable elements of a machined blind flange component 66, a packing or sealing gland component 69, and an adjustable axial-positioned cylindrical hollow element 68 with end welded flange 67, element 68 extends into adsorption-desorption assembly therein establishing a gas vacuum sealing contact with the preferred molecular sieve adsorbent "cartridge-type sub-assembly's central axial-positioned gas void space. As desorption operation is earlier described, purge gas will also be emitted into connection 67 for flow passage into the central axial-positioned gas void space of the preferred molecular sieve adsorbent 'cartridge-type subassembly' contained within the adsorption-desorption assembly. Any design of similar functioning closure and sealing means can provide the connection and conduit means for the adsorption-desorption assembly's separated product gas stream flow to be extracted from within the adsorption-desorption assembly and conduit flow-connected to the downstream-positioned gas product compressor inlet connection as shown in FIG. 1 and FIG. 2. Said designs of similar functioning closure and sealing means can also be provided with modified pipe or vessel hinged closure assemblies that are welded to either or both ends of the adsorption-desorption assembly shell.

The FIG. 3 described invention's unique adsorption-desorption assembly apparatus with end-closure design means can accept the employment of herein described molecular sieve 'cartridge-type subassemblies' that can be readily inserted or removed when the pure VSA gas separation system duties change, or when more advanced and efficient molecular sieves become available as new products of gas adsorbent technology.

Figure 4:
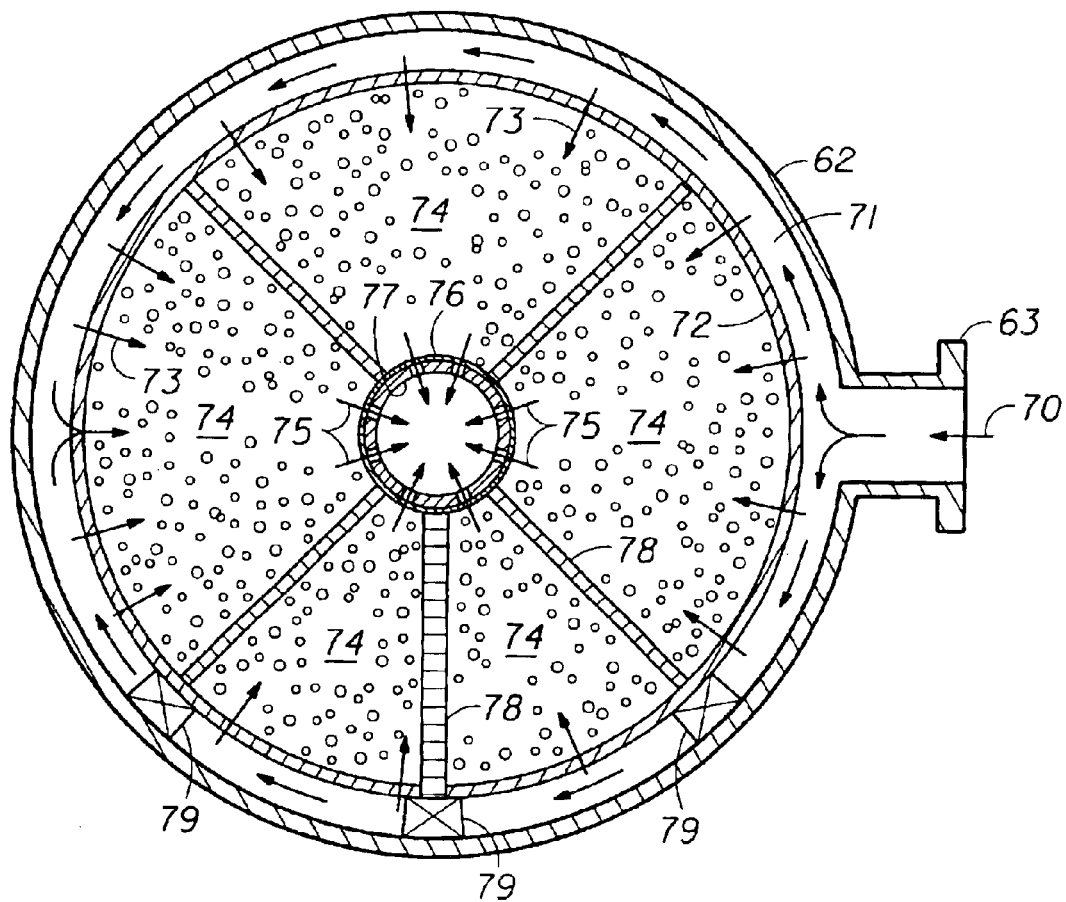
FIG. 4 is a cross-sectional view of the invention's employed adsorption-desorption assembly apparatus with internal molecular sieve 'cartridge-type' sub-assembly.

Referring now more particularly to FIG. 4 therein showing the 4—4 cross-sectional view of the FIG. 3 adsorption-desorption assemblies, the flow stream 70 of feedstock gases enters the invention's pure VSA adsorber assembly apparatus through flange connection 63 that is welded to the adsorber assembly outer shell 62. When the pure VSA adsorber assembly apparatus shell diameters are dimensionally greater than 4 feet, flange connections 63 can alternately be positioned on both sides of the adsorber assembly shell 62 at example 3 o'clock and 9 o'clock positions. This described positioning of flange connections 63 can facilitate the closely positioned installation of one horizontal adsorber assembly over the top of another horizontally installed adsorber assembly.

During the invention pure VSA adsorption operation, the induced flow of feedstock gas 70 enters the adsorption-desorption assembly apparatus through flange connection 63 and the flow of gases are distributed at low gas flow velocities within the outer annular void space 71 surrounding combined molecular sieve bed material 74. The flow of gases in void space 71 thereafter are flow directed as shown by 73 through a cylindrical perforated material 72 as further described later. Within a given diameter of adsorption-desorption assembly, the annular gas distribution void space 71 cross-section flow area and volume is established by the height of the short-length low surface friction spacer blocks 79 that are appropriately and intermittently spaced longitudinally along the length of the adsorption-desorption assembly. Additional low surface friction spacer blocks 79 can be positioned as required to increase the ease in which the adsorption-desorption assembly's complete internal molecular sieve subassembly of preferred "cartridge-type" design can be inserted into or removed from the interior of the horizontal adsorption-desorption assembly.

The flow of feedstock gas 70 within void space 71 is induced with direction path 73 to flow radially-inward through one or more layers of porous or perforated material 72 that outwardly secures the adsorbent material within the combined molecular sieve subassembly bed segments 74 that are further boundary-defined by later described plates 78 and 77 pipe or tubing. The invention feedstock gases 70 initial flow velocity into the molecular sieve bed of greatly increased surface area is corresponding greatly reduced in velocity (in the case of air separation with an example system equal molecular sieve volume as contained in a comparable product rated conventional VSA system's vertical molecular sieve bed or beds). As the waste gas portions of the feedstock gas are steadily adsorbed during progressive radially-inward gas flow penetration into each molecular sieve bed segment 74 depth of decreasing cross-section area, the later desired product gas flow 75 (high purity oxygen in the case of pure VSA air separation) can also emerge from the adsorbent bed at an approximate continued equal flow velocity rate as the feedstock gas entry velocity into the adsorbent bed.

Each molecular sieve bed segment 74 can be formed within the combined porous or perforated material 72 that can be comprised of one or more layers of porous woven mesh material and the molecular sieve side supported plate partitions 78 connected to both perforated material 72 and central axial core pipe or tubing 77. The adsorption-desorption assembly's preferred 'cartridge-type' molecular sieve subassembly's centerline axis-positioned central core pipe or tubing 77 can be perforated and/or slotted to permit the induced flow of separated product gas 75 to flow from the molecular sieve bed through one or more layers of porous woven mesh material 76 into the centerline axis-positioned central core pipe's or tubing's 77 inside diameter volume space (and subsequently thereafter flow-withdrawn from the adsorption-desorption assembly through connection 67 of FIG. 3).

During the invention's pure VSA desorption operation sequence (with counter-current directional gas flow to that indicated in FIG. 4 for the adsorption operation), the induced extraction of waste gases (contained with the adsorption-desorption assembly's gaseous void spaces and molecular sieve bed material 74) comprises a reverse radially-outward flow of adsorption-desorption assembly extracted waste gases that enters outer annular flow space 71 and collectively exits through connection 63. Prior to the low-end psia induced desorption operation pressure condition being achieved, a limited induced flow quantity of produced product gas is axially introduced through connection 67 of FIG. 3 into the central axial core pipe or tubing 77. The flow of purge gas flows through fore-described openings in 77 and woven mesh material 76 for a contributed and continued induced radially-outward flow of mixed waste and purge gases through the adsorption-desorption assembly. The induced flow mixture of purge and waste gases exits from the adsorption-desorption assembly through connection 63 in a counter-current direction to the FIG. 4 shown feedstock supply stream 70 employed for the adsorption operation.

The data numbers in Table 4 below are representative of one set of conditions in which the pure VSA system desorption compressor is operating during air separation. The computer process simulation is based on the desorption operation having a beginning internal adsorption-desorption assembly pressure of 12 psia and declining to a bottom ending pressure of 5.5 psia, and the desorption compressor having waste gas inlet temperature of 100° F. Table 4 data shows typical portions of gross oxygen product that is removed for gas purging purposes within the desorption operation, as well as the increase in electric power consumption from only a 5% variation in gas compression efficiency from the preferred 80% efficient compressor.

TABLE 4

90 TPD Pure VSA Oxygen System Desorption Compressor Power Requirements

| Pure VSA Desorption Compressor Efficiency Ranges | 80% | 75% |
|---|---|---|
| Waste gas & purge gas flow rate (SCFM): | 8,330 | 8,330 |
| Gas compression power (kW): | 136.8 | 147.7 |
| Compressor power with 5% mechanical losses (kW): | 143.7 | 155.7 |
| kW power/95% motor efficiency (kW): | 151.2 | 163.2 |
| System pure oxygen gross production: (Tons/Hr): | 5.218 | |
| System pure oxygen net delivery (Tons/Hr): | 3.750 | |
| System recycled oxygen purge gas (Tons/Hr): | 1.468 | |

The data numbers in Table 5 below are representative of one set of alternative operating conditions in which the pure VSA system is operating during air separation. The adsorption-desorption assembly produced oxygen product gas can be alternatively chilled prior to its entry into the adsorption compressor, thereby providing the means for both producing a low temperature purge gas and decreasing the adsorption compressor's power requirements and operating gas temperatures.

The following alternative example assumptions are made: (a) the chiller unit supplies a 20 to 25° F. ethylene glycol/water chilled heat exchange fluid mixture into the chilled gas heat exchanger, thereby generating a 40° F. gas inlet temperature to the adsorption compressor; (b) The computer process simulation being based on the adsorption-desorption assembly produced oxygen product gas having a 12 psia pressure and the chilled oxygen product gas exiting the chilled gas heat exchanger at 11.7 psia. Table 5 shows that a net 0.68 kWh/oxygen ton rate premium (or approximately 5.4% of Table 2 shown 12.54 net kWh/oxygen ton-rate) is required to achieve the collective operational benefits from the employment chilled purge gas and reduced gas compressor operating temperatures.

TABLE 5

Pure VSA Product Gas Alternate Chilling Auxiliary System Power Requirements

| Pure VSA Adsorption Compressor Efficiency Ranges: | 80% to 70% |
|---|---|
| Gas Heat Exchanger Supply Temperature (° F.): | 110 |
| Chilled Gas Discharge Gas Temperature (° F.): | 40 |
| 95% oxygen gas product mass flow rate (Lbs/Hr): | 7,984 |
| Differential Enthalpy from gas 70° F. delta T (Btu/Lb): | 9.234 |
| Heat Transferred from gas product (Btu/Hr): | 73,724 |
| Gas stream refrigeration load equivalent (Tons): | 6.14 |
| Air-cooled chiller unit power input energy (kWh): | 8.60 |
| Adsorption compressor power savings (kWh): (Table 2 value 47.01 kW-Table 3 value 40.96 kW) × 1 Hr. | 6.05 |
| Total net added power required by system (kWh): | 2.55 |
| Total net added power for 3.75 ton/Hr oxygen (kWh/Ton rate): | 0.68 |

While the invention has been described in its preferred embodiments, it is appreciated that system and apparatus variations may be made to maximize gas separation performance of numerous individual available molecular sieve materials that can be chosen for efficient separation of gases at various system TPD rated capacities and site conditions, without departing from the scope and spirit of the invention.

I claim:

1. A highly energy-efficient pure vacuum swing gas adsorption and separation process for separating a predominate oxygen gas mixture from air feedstock gas, the process comprising:

(a) supplying the air feedstock gas from which the predominate oxygen gas mixture will be separated to two horizontally-oriented adsorption-desorption vessels in communication with an inner connecting conduit, each vessel and the inner connecting conduit configured to alternatively perform adsorption and desorption cycles and the vessels having nitrogen-selective adsorbent material capable of separating a predominate oxygen gas mixture from the air feedstock gas;

(b) inducing the flow of air feedstock gas into the first adsorption-desorption vessel during the adsorption cycle and extracting the flow of the gross product predominate oxygen gas mixture out of the first adsorption-desorption vessel exclusively through vacuum pressure created by a first compressor in communication with and positioned downstream of the first and second adsorption-desorption vessels;

(c) removing residual predominate nitrogen and lesser oxygen contained in the second adsorption-desorption vessel during the desorption cycle by inducing vacuum extraction of the predominate nitrogen and lesser oxygen through a second compressor and by purging the second adsorption-desorption vessel with a portion of the gross product predominate oxygen gas mixture supplied upstream from the first compressor, thereby leaving a net product predominate oxygen gas mixture to be collected downstream of the first compressor;

(d) sequencing the first and second adsorption-desorption vessels such that after one vessel completes an adsorption cycle it begins a desorption cycle and as the other vessel completes a desorption cycle it begins an adsorption cycle, with each cycle being of approximately equal time duration; and (e) continuing this series of steps to produce a desired amount of separated predominate oxygen gas mixture.

2. The process of claim 1 additionally including the step of exhausting to atmosphere the extracted residual predominate nitrogen and the gross product predominate oxygen gas mixture supplied upstream from the first compressor used to purge an adsorption-desorption vessel during the desorption cycle.

3. The process of claim 1, wherein the sequenced adsorption and desorption cycles are approximately 30 seconds each.

4. The process of claim 1 additionally including the step of cooling the gross product predominate oxygen gas mixture by passing the gas mixture through a heat exchanger located downstream of the adsorption-desorption vessels and upstream of the first compressor, the cooling step performed before a portion of the gross product predominate oxygen gas mixture is used to perform the purging step of 18(c).

5. The process of claim 1 additionally including the step of using a pressure stabilizing tank located downstream of the first compressor for maintaining a relatively even pressure of the net product predominate oxygen gas mixture.

6. The process of claim 1 additionally including the step of conditioning the air feedstock gas before it enters the adsorption-desorption vessels.

7. The process of claim 6, wherein the conditioning step comprises preheating the air feedstock gas.

8. A highly energy-efficient pure vacuum swing gas adsorption and separation system for separating a predominate oxygen gas mixture from supplied air feedstock gas, the system comprising:

(a) a first conduit system for transporting the supplied air feedstock gas to be separated;

(b) two horizontally-oriented adsorption-desorption vessels connected to the first conduit system and in communication with an inner conduit system, each adsorption-desorption vessel and the inner conduit system configured to alternatively perform adsorption and desorption cycles, each vessel having
  (1) a horizontally-oriented cylindrical outer shell assembly having two ends and at least one inlet for supplying the flow into the cylindrical outer shell assembly of the air feedstock gas to be separated,
  (2) two closure means for sealing the cylindrical outer shell assembly, one closure means secured to each of the ends of the cylindrical outer shell assembly,
  (3) a nozzle assembly, attached to one of the closure means of the cylindrical outer shell assembly, through which the separated oxygen gas mixture is evacuated, and
  (4) an adsorption bed assembly contained in the cylindrical outer shell assembly, the adsorption bed assembly including a molecular sieve bed assembly having one or more layers of perforated or porous mesh material and a predominate nitrogen-selective material contained within the mesh material, configured such that the air feedstock gas is separated as it passes through the adsorption bed assembly leaving gross product predominate oxygen gas mixture to be evacuated through the nozzle of each adsorption-desorption vessel;

(c) a control means for sequentially cycling and controlling the adsorption-desorption vessels such that when one of the adsorption-desorption vessels performs an adsorption cycle the other vessel performs a desorption cycle;

(d) a second conduit system connected to the nozzles of the adsorption-desorption vessels for transporting the gross product predominate oxygen gas mixture separated in the adsorption-desorption vessels for collection;

(e) a first compressor located downstream of and in communication with the adsorption-desorption vessels and the second conduit system, the first compressor configured to induce the flow of air feedstock gas into the adsorption-desorption vessels during each vessel's adsorption cycle and extracting the flow of gross product predominate oxygen gas mixture out of adsorption-desorption vessels exclusively through vacuum pressure;

(f) a second compressor and third conduit system in communication with the adsorption-desorption vessels, the second compressor configured to remove predominate residual nitrogen and lesser oxygen gases contained in the adsorption-desorption vessels during the desorption cycle through the third conduit system by inducing vacuum extraction of the predominate nitrogen and lesser oxygen gases and by purging the vessels with a portion of the gross product predominate oxygen gas mixture supplied upstream from the first compressor, thereby leaving a net product predominate oxygen gas mixture to be collected downstream of the first compressor.

9. The highly energy-efficient pure vacuum swing gas adsorption and separation system of claim 8 additionally including a heat exchanger located downstream of the adsorption-desorption vessels and upstream from the first compressor, the heat exchanger configured to cool the gross product predominate oxygen gas mixture.

10. The highly energy-efficient pure vacuum swing gas adsorption and separation system of claim 8 additionally including:

(a) a first heat exchanger located downstream of the first compressor for cooling the net product predominate oxygen gas mixture after it is compressed by the first compressor;

(b) a third compressor located downstream of the first heat exchanger for compressing the net product predominate oxygen gas mixture after it is cooled by the first heat exchanger;

(c) a second heat exchanger downstream of the third compressor for cooling the net product predominate oxygen gas mixture after it is compressed by the third compressor; and (d) a fourth compressor located downstream of the second heat exchanger for compressing the net product predominate oxygen gas mixture after it is cooled by the second heat exchanger.

11. The highly energy-efficient pure vacuum swing gas adsorption and separation system of claim 8 additionally including a preheater located upstream from the adsorption-desorption vessels, the preheater configured to heat the air feedstock gas before entry into the adsorption-desorption vessels.

12. The highly energy-efficient pure vacuum swing gas adsorption and separation system of claim 8 additionally including a pressure stabilizing tank located downstream of the first compressor.

13. The highly energy-efficient pure vacuum swing gas adsorption and separation system claim 8 wherein the axial length of each adsorption-desorption vessel is at least two times the diameter of the vessel.

14. The highly energy-efficient pure vacuum swing gas adsorption and separation system of claim 8 wherein the adsorption bed assembly of at least one adsorption-desorption vessel comprises one or more cartridges that may be integrally removed from the vessel and replaced.

15. A horizontally-oriented, radial-flow adsorption-desorption vessel for separating a predominate oxygen gas mixture from air feedstock gas, the vessel comprising:

(a) a horizontally-oriented cylindrical outer shell assembly having an inner surface, two ends, and at least one inlet for supplying the flow into the cylindrical outer shell assembly of the air feedstock gas to be separated;

(b) two closure means for sealing the cylindrical outer shell assembly, one closure means secured to each of the ends of the cylindrical outer shell assembly;

(c) a nozzle assembly, attached to one of the closure means of the cylindrical outer shell assembly, through which the separated predominate oxygen gas mixture is evacuated; and (d) an adsorption bed assembly contained in the cylindrical outer shell assembly and supported by one or more supports attached to the inner surface of the cylindrical outer shell assembly, the adsorption bed assembly having (1) an outer shell, having an inner surface, (2) an inner central pipe, having an outer surface, and oriented generally along the axis of the cylindrical outer shell assembly and in communication with the nozzle assembly, the inner central pipe configured to collect the flow of separated predominate oxygen gas mixture and direct the separated predominate oxygen gas mixture to the nozzle assembly for evacuation, and (3) a molecular sieve bed assembly contained between the outer shell of the adsorption bed assembly and the inner central pipe, the molecular sieve bed assembly having one or more layers of perforated or porous mesh material and a predominate nitrogen-selective material contained within the mesh material.

16. The vessel of claim 15, wherein the axial length of the vessel is at least two times the diameter of the vessel.

17. The vessel of claim 15, wherein the adsorption bed assembly additionally includes at least two partitions, each having two ends, one end connected to the outer surface of the inner central pipe and the other end connected to the inner surface of the outer shell of the adsorption bed assembly.

18. The vessel of claim 15, wherein the adsorption bed assembly comprises one or more cartridges that may be integrally removed from the vessel and replaced.

19. The vessel of claim 18, wherein the adsorption bed assembly additionally includes at least four partitions, each having two ends, one end connected radially to the outer surface of the inner central pipe and the other end connected radially to the inner surface of the outer shell of the adsorption bed assembly, the partitions are spaced to form cross-sections between them that narrow from the inner surface of the outer shell to the outer surface of the inner central pipe such that the velocity of the predominate oxygen gas mixture entering the inner central pipe through the cross-sections is approximately equal to the velocity of the air feedstock gas entering the adsorption bed assembly.

20. The vessel of claim 15, wherein the adsorption bed assembly additionally includes at least four partitions, each having two ends, one end connected radially to the outer surface of the inner central pipe and the other end connected radially to the inner surface of the outer shell of the adsorption bed assembly, the partitions are spaced to form cross-sections between them that narrow from the inner surface of the outer shell to the outer surface of the inner central pipe such that the velocity of the predominate oxygen gas mixture entering the inner central pipe through the cross-sections is approximately equal to the velocity of the air feedstock gas entering the adsorption bed assembly.

* * * * *